United States Patent
Sonnenschein et al.

(10) Patent No.: US 8,353,691 B2
(45) Date of Patent: Jan. 15, 2013

(54) PISTON PUMP

(75) Inventors: Georg Sonnenschein, Eschborn (DE); Georg Obersteiner, Idstein (DE); Jurgen Uhlmer, Hosbach (DE); Achim Possmann, Darmstadt (DE); Andreas Hettrich, Bruchkobel (DE)

(73) Assignee: Continental Teves AG & Co., oHG (DE)

( * ) Notice: Subject to any disclaimer, the term of this patent is extended or adjusted under 35 U.S.C. 154(b) by 659 days.

(21) Appl. No.: 12/065,113

(22) PCT Filed: Sep. 8, 2006

(86) PCT No.: PCT/EP2006/066184
§ 371 (c)(1),
(2), (4) Date: Feb. 28, 2008

(87) PCT Pub. No.: WO2007/031472
PCT Pub. Date: Mar. 22, 2007

(65) Prior Publication Data
US 2008/0246225 A1 Oct. 9, 2008

(30) Foreign Application Priority Data
Sep. 14, 2005 (DE) .......................... 10 2005 043 724
Mar. 8, 2006 (DE) .......................... 10 2006 010 674

(51) Int. Cl.
*F04B 39/10* (2006.01)
*F04B 53/12* (2006.01)

(52) U.S. Cl. ........ 417/545; 417/549; 417/552; 417/444; 417/470; 417/471

(58) Field of Classification Search .................. 417/470, 417/471, 545, 549, 552, 554, 444; 277/434, 277/436–437, 449–455, 458–460, 467
See application file for complete search history.

(56) References Cited

U.S. PATENT DOCUMENTS

| | | | | |
|---|---|---|---|---|
| 1,434,591 | A * | 11/1922 | Copp ............................. | 277/453 |
| 4,676,143 | A * | 6/1987 | Nomura et al. .................. | 92/243 |
| 5,050,892 | A * | 9/1991 | Kawai et al. ................... | 277/436 |
| 5,450,783 | A * | 9/1995 | Binford ........................... | 92/208 |
| 5,823,639 | A |  10/1998 | Zinnkann et al. | |

(Continued)

FOREIGN PATENT DOCUMENTS
DE 197 12 147 A1 3/1998
(Continued)

OTHER PUBLICATIONS
Machine Translation of WO 2004072478.*
(Continued)

*Primary Examiner* — Charles Freay
*Assistant Examiner* — Christopher Bobish
(74) *Attorney, Agent, or Firm* — RatnerPrestia

(57) ABSTRACT

A piston pump for the hydraulic energy supply in a motor vehicle, comprising a piston that is movably arranged in a stepped bore of an accommodating member that is provided with a closure, the piston carries a seat for an elastic sealing element which accommodates the sealing element with axial play, and with radial elastic preload for the purpose of sealing between piston and cylinder. The seat for the sealing element has a structure which generates forces pointing radially towards a piston axis and expanding the sealing element in a radial direction, and that the structure produces an elastic deformation of the sealing element for an increased and dosed sealing contact pressure between piston and cylinder.

17 Claims, 4 Drawing Sheets

U.S. PATENT DOCUMENTS 6,224,352 B1 * 5/2001 Hauser et al. ............... 417/313
6,938,901 B2 * 9/2005 Tsuchiya et al. ............. 277/440

FOREIGN PATENT DOCUMENTS

| DE | 197 47 850 A1 | 2/1999 |
| DE | 198 54 716 A1 | 5/2000 |
| WO | WO 99/06702 | 2/1999 |
| WO | WO 99/58853 | 11/1999 |
| WO | WO 00/65234 | 11/2000 |
| WO | WO 2004072478 A1 * | 8/2004 |

OTHER PUBLICATIONS

Patent Abstracts of Japan Publication No. 2000110737 A, dated Apr. 18, 2000, Applicant: Nissin Kogyo Co. Ltd.

Patent Abstracts of Japan Publication No. 06011044, dated Jan. 21, 1994, Applicant: Honda Motor Co. Ltd.

* cited by examiner

PISTON PUMP

This application is the U.S. national phase application of PCT International Application No. PCT/EP2006/066184, filed Sep. 8, 2006, which claims priority to German Patent Application No. DE102005043724.9, filed Sep. 14, 2005 and German Patent Application No. DE102006010674.1, filed Mar. 8, 2006, the contents of such applications being incorporated by reference herein.

BACKGROUND OF THE INVENTION

1. Field of the Invention

The present invention relates to a piston pump which is used for supplying a hydraulic energy in a motor vehicle.

2. Description of the Related Art

Modern piston pumps for use in driving dynamics control systems for motor vehicles suffer from the problem that new functions require from the pump to have an extended useful life and to operate against high system pressure at an increasing rate. In this case, the system pressure can principally prevail both on the suction side and the pressure side of the piston pump. This problem is encountered, for example, in the case of an electrohydraulic parking brake in which it is desired to trigger the parking brake function by a pressure pulse of the pump.

Circumstances and marginal conditions of this type place very high demands on the components of the pump such as the sealing elements employed in particular. Their resistance to wear and slot extrusion is of special interest.

In the case of slot extrusion, a back of a sealing element on the low-pressure side is urged into a slot as a consequence of the prevailing difference in pressure. To avoid this effect, the sealing element is required to exhibit a certain ability of bridging the slot or a certain shearing resistance. If the shearing resistance is not sufficient, the back of the seal will move into the slot, where it is destroyed. This process is still supported by the fact that the accommodating bore for the piston expands at least slightly when exposed to the internal pressure and compresses again abruptly when relieved from load. The quasi elastic breathing process has as an effect that the sealing material disposed in the slot is unable to re-deform in time, in particular at low temperatures. So-called extrusion tabs can develop at the sealing element which will extend with continuous time of application. In the final stage, the seal will fail because no sufficient sealing function is safeguarded due to changed distributions of radial stress in the sealing element. The major influences for the slot extrusion are the slot 'S' that must be sealed radially, the system pressure 'P', the radial profile width of the sealing element 'T', the nominal diameter 'd' and the working temperature 'T' as well as the elasticity of the sealing element 'E'. The extrusion behavior can be influenced by the conception of all mentioned variables. However, mainly the physical material properties of the seal are of decisive importance under thermal load.

Thermoplastic elastomers such as EPDM, thermoplasts such as PTFE as well as materials belonging to the group of the thermoplastic urethanes are used for sealing elements in many cases. The physical properties of the materials will change with rising temperature to the disadvantage of extrusion safety. Usually, TPU materials (thermoplastic polyurethanes) can withstand temperatures up to 100° C. EPDM and PTFE will withstand up to roughly 120° C. In these cases the system pressure is limited so that a combination of maximum temperature at maximum pressure should be avoided. Alternatively, the slide slot 'S' should be reduced for such cases, what has considerable consequences related to works economy in the series manufacture.

According to the abstract of JP 2000-110737, a piston is furnished with an annular groove into which a ring seal is embedded that is dynamically sealing at a cylinder wall. To constructively enhance the resistance to extrusion, the document discloses to provide an annular slot at the seal's back between a piston and a piston accommodation in a greatly expanded fashion as well as with a wedge-like tapering profile. The intention of this procedure is to provide the sealing element with an expanded space for deformation into which the sealing element may enter and also exit again elastically.

Potential shearing damage at the sealing element is avoided in the prior art measure by tolerating a reduced support of the sealing element within the groove. This can have as a result a reduced sealing effect and also a reduced guiding function. The reason is that an expansion of the sealing element into the wedge-shaped slot causes a reduction of the contact pressure between cylinder and sealing element.

SUMMARY OF THE INVENTION

The invention has for its object to allow a globally improved coordination in order to achieve an improved adaptation of the seal in terms of sealing effect and frictional resistance as well as a longer useful life of the pump and an increased resistance to slot extrusion.

To solve this object, it is suggested that the seat for the sealing element has a structure which generates forces pointing radially towards a piston axis and expanding the sealing element in a radial direction, and that the structure produces an elastic deformation of the sealing element for an increased dosed sealing contact pressure between piston and cylinder. The consequence is that it is rendered possible to position the cylinder-side press fit of the seal in a radial direction in such a way that the frictional resistance is reduced and an improved resistance to slot extrusion is achieved as well as an effect which extends the useful life as compared to conventional enhanced press fit of the seals.

It is provided in a favorable embodiment of the invention that the dimensions of seat, sealing element and cylinder are conformed to each other and the sealing element is so designed in order to be arranged on its seat substantially without clamping forces but secured in position, and that at least in one additional case tolerances are set in such a fashion that a fluid-tight elastic clamping arrangement is constituted between cylinder, sealing element and piston when the piston with sealing element is arranged in the cylinder. This allows a progressive, at least partly automated assembly of the pump, in which case the sealing element can be designed so as to be slightly adhesive on its seat to prevent it from being displaced inadvertently in an automated assembly.

The press fit of the seal can be restricted especially well to a certain area and can be limited within this area because the seat for the sealing element has a structure with an intermittent abutment surface for the sealing element. Preferably, the structure has relative maxima and relative minima, and the relative maxima and the relative minima are arranged alternately at regular or irregular distances in a circumferential direction and/or in parallel to the piston axis. It is possible that the maxima are designed on the seat in an annularly circumferential fashion and that the minima are grooves which extend in parallel or concentrically relative to the piston axis.

A piston pump which lends itself to a comparatively straightforward manufacture is identified by a seat which is designed as a rounded polygonal element. An elastic seal deformation is then achieved especially in the area of the rounded edges of the polygonal element.

Particularly effective variations of the invention are characterized in that the seat includes means that allow an increasing contact pressure of the seal with increasing hydraulic pressure, and vice-versa, in which case the means especially have a channel-like design and are open towards the working chamber, and are especially integrated into the structure. The sealing contact pressure regulates itself as a result, and the press fit of the seal is augmented only if the pressure in the working chamber makes this necessary.

It can be provided in general that the seat includes at least two portions, a first seat portion of which has an essentially cylindrical or structured design, and with a second seat portion having a conical design. This permits a division of duties in the area of the seat because the cylindrical seat portion allows the preliminary holding or clamping function, while the conical seat portion achieves an increased or reduced press fit of the seal depending on the situation.

A modification of the invention is characterized in that the profiling of the seat includes relative maxima and relative minima and that the relative maxima and the relative minima are arranged alternately at regular or irregular distances in a circumferential direction and/or in parallel to the piston axis. These measures support dosage of the hydrodynamic servo force. Principally the same applies to modifications in which the maxima are designed on the seat centrically to the piston axis in an annular circumferential fashion, or when the minima are configured as grooves which extend in parallel or concentrically to the piston axis.

In a special variation of the invention, the seat has a design profiled in the way of a spline shaft. This allows a targeted support of the sealing element. The projections of the spline profile can be rounded off, what is a preventive against damaging the sealing element.

When the sealing element is arranged with axial play on its seat, this allows along with an axially different profiling that the sealing element, due to its forced relative displacement in the dead centers, can receive a different support during a forward stroke (pressure stroke) than during a return stroke (suction stroke).

Additional advantages can be achieved when seat and sealing element include means which, with increasing hydraulic pressure, can produce an increasing sealing contact pressure. The reason is that this way a targeted, very precise support of the sealing element is combined with the advantages of the servo-assisted press fit.

In a special embodiment of the invention, the seat includes a detachable clamping cone which acts on the sealing element in a pressure stroke.

BRIEF DESCRIPTION OF THE DRAWINGS

Further details of the invention can be seen in the following description by way of the drawings. In the accompanying drawings.

DETAILED DESCRIPTION OF THE PREFERRED EMBODIMENTS

Figure 1:
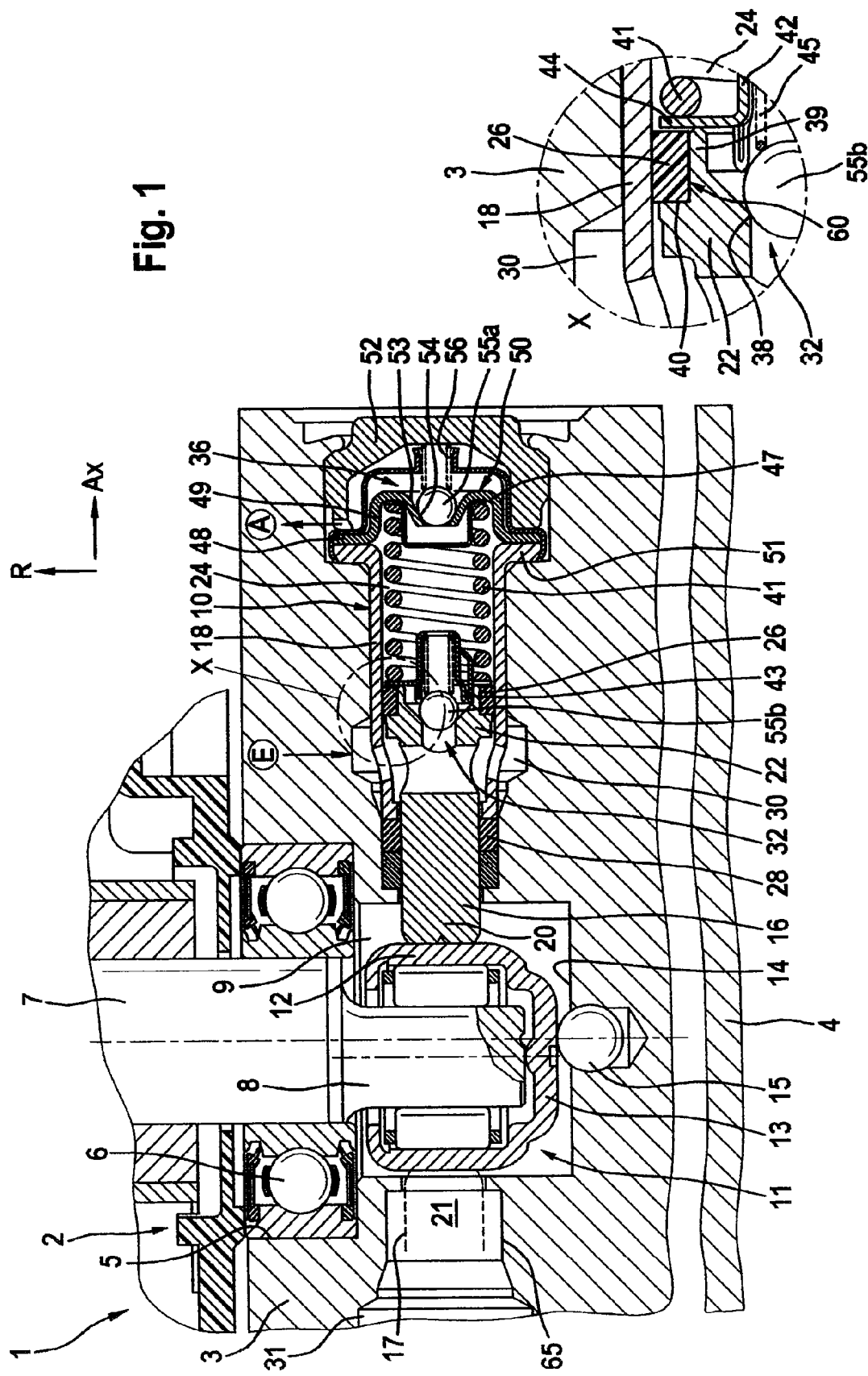
FIG. 1 is a cross-sectional, greatly enlarged view of a piston pump, and an enlarged view of one detail.

FIG. 1 shows an aggregate with a drive 2 outlined in a sketch, in particular an electric motor which is flanged to an accommodating member 3 for electromagnetically operable valves, channels, accumulator or damper chambers and a piston pump 10. An electronic control unit 4, shown only in a schematic representation, is provided on an opposite side of the accommodating member 3. The illustrated aggregate 1 is especially used for slip control or driving stability control of motor vehicles, while similar or other cases of application are feasible.

A preferably central stepped bore 5 of the accommodating member 3 accommodates a sealed rolling bearing 6 of the drive shaft 7, the free end of which is designed as an eccentric 8 and projects into a crank chamber 9 of the stepped bore 5. It is principally possible that the eccentric 8 is ground directly at the drive shaft 7 or motor shaft, or that it is designed as a separate construction element and is attached to the drive shaft 7. For an extended time of operation of the pump, the crank chamber 9 can be flooded with leakage fluid, especially with brake fluid, in which case a reservoir that is connected to the crank chamber 9 serves for the fluid take-up inside the drive 2, inside the accommodating member 3, inside the control unit 4 or in limited areas between these components.

The eccentric 8 is equipped with a needle bearing 11 that is closed on one side by a bowl-shaped outside ring 12, the bowl bottom 13 of which, with a button-shaped projection, is movable into abutment on a frontal end of the drive shaft 7 in a punctual and low-friction manner. A bottom 14 of the crank chamber 9 comprises a ball 15 so that the bowl bottom 13 with an outside surface remote from the motor shaft abuts with low friction on the ball 15, and the outside ring 12 which is rotatable in relation to the accommodating member 3 has no direct contact with the material of the accommodating member 3. This counteracts friction stress of the accommodating member 3, without having to apply wear-resistant material coatings such as anodic oxidations on walls of an aluminum accommodating member 3.

As can be seen in FIG. 1, several pistons 16, 17 can be arranged, for example, opposite each other, in a star-like fashion or in any other fashion.

Each piston 16, 17 is arranged so as to be movable within a stepped bore either in a separate bush 18, or it is guided directly in the stepped bore of accommodating member 3. The pistons 16, 17 extend with a first hydraulic diameter a cylinder comprising a supply chamber 30, 31, reach with one end 20, 21 into the crank chamber 9 and contact there a periphery of the outside ring 12. For configuring a stepped piston, another end 22 of piston 16 includes a second hydraulically active diameter and projects into a displacement chamber 24. While the second end 22 of the pistons 16, 17 is guided in the bush 18, sealed by way of a sealing element 26, another guiding and sealing arrangement 28 permits the arrangement of the supply chamber 30, 31 between the said sealing arrangement 28 and a non-return valve 32 acting as a suction valve. The pressure fluid propagates from a pressure fluid inlet E through a channel and preferably a filter provided on a sleeve into the supply chamber 30, 31. In the suction stroke the pressure fluid is conveyed into the displacement chamber 24, with the non-return valve (suction valve) 32 being open, and in the displacement stroke into a pressure fluid outlet A, with the non-return valve (pressure valve) 36 open. It should be added still that the effective hydraulic piston diameter in the displacement chamber 24 along with the hydraulically effective diameter in the supply chamber 30, 31 achieves improved suction properties in the case of viscous pressure fluid.

The stepped end 22 of piston 16 has a valve seat 38 for a spring-biased valve member 55 b. A cylindrical wall portion 39 of the piston 16 is disposed at end 22 and carries the sealing element 26 on an outside surface. The valve seat 38 has a stop 40 for sealing the sealing element 26 axially in position. A component 42 which acts additionally as a spring retainer for a piston restoring spring 41 and a valve spring 45, or a separate spring retainer as shown exemplarily in FIG. 2, abuts with a shoulder area on legs 43 bent axially at right angles on a front side of wall part 39. Radial legs 44 can avoid an axial relative displacement of the sealing element 26 so that said is fixed essentially on the piston 16 and oscillates with it relative to the accommodating member 3. Axially directed legs can extend below the sealing element 26 in order to design a structured seat 60.

The piston restoring spring 41 extends through the entire displacement chamber 24 and bears with an end against an abutment 47 remote from the piston and additionally serving as a bottom for the bush. According to the embodiment according to FIG. 1, the bush 18 has a bowl-shaped design, and the abutment 47 is a plate-shaped component which comprises a radial flange 48, a cylindrical wall 49 and a basically plane bottom area 50. As can be seen, the radial flange 48 bears flatly against a radial flange 51 of the bush 18. While the wall 49 is cylindrical, the bottom area 50 includes a collar 53 pointing in the direction of piston 16 and having a seat 54 for a valve member 55 a of the non-return valve (pressure valve) 36. Consequently, a space provided between collar 53 and wall 49 is meant for the accommodation of the restoring spring 41, and a protuberance formed by the collar 53 accommodates essential parts of the non-return valve 36 such as valve member 55 a and valve spring 56 in particular. As a result, the mentioned components are arranged in each other in such a fashion that they overlap each other at least in part in a radial direction R, whereby mounting space is saved. As elucidates furthermore from FIGS. 1 and 2, the collar 53 has a largely conical shape. Its (outside) diameter initially corresponds basically to the (inside) diameter of the restoring spring 41, tapering subsequently in the direction of seat 54. This improves the centering of the restoring spring, especially during the assembly.

A special feature of the piston pump involves that a seat 60 for the sealing element 26 is provided with a structure which generates forces that point radially towards a piston axis and radially expand the sealing element 26, and that the structure produces an elastic deformation of the sealing element 26 for an enhanced and dosed sealing contact pressure between pistons 16, 17 and cylinder. The dimensions of seat 60, sealing element 26 and cylinder are conformed to each other because the sealing element is oversized in such a fashion that it can be arranged on its seat 60 rid of clamping force, and that at least in one additional case tolerances are set such that when the piston 16 with sealing element 26 is arranged in the cylinder, a fluid-tight elastic clamping arrangement is achieved between cylinder, sealing element 26 and piston 16.

Figure 2:
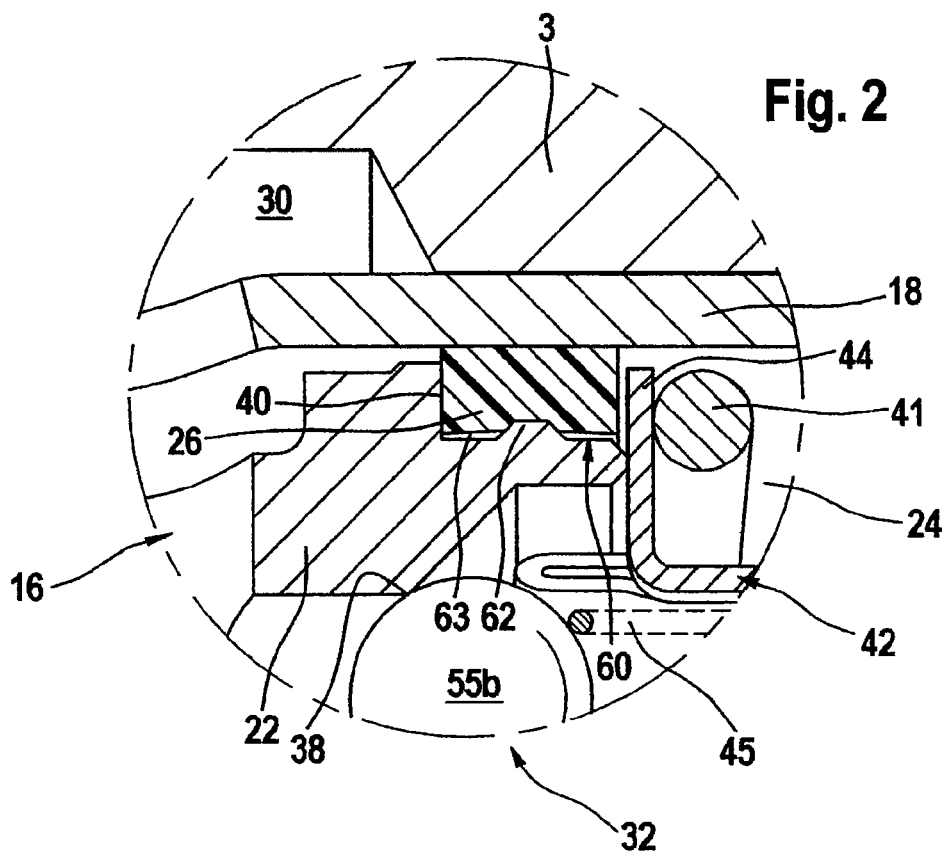
FIG. 2 is a cross-sectional view of a first embodiment, on an enlarged scale.
Figure 3:
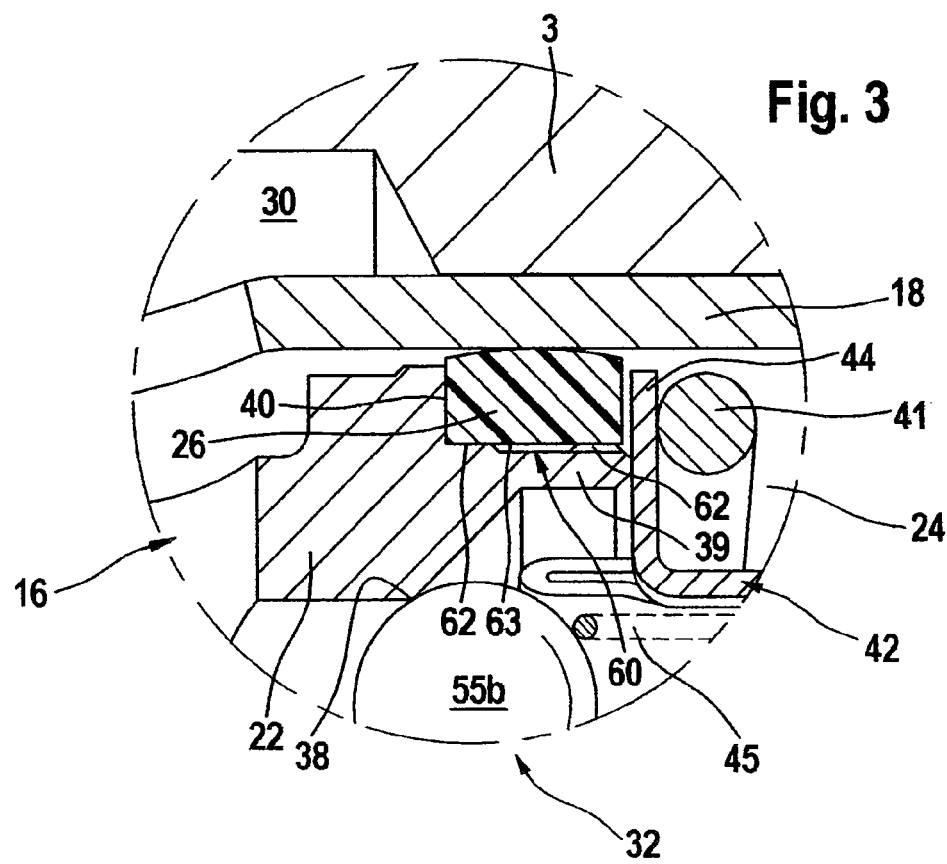
FIG. 3 is a cross-sectional view of a second embodiment, on an enlarged scale.

FIGS. 2 and 3 depict piston pumps where the seat 60 has a structure with an intermittent abutment surface for the sealing element 26. In this arrangement, the structure of the seat has relative maxima 62 and relative minima 63, and the relative maxima 62 and the relative minima 63 are arranged alternately at regular or irregular distances in a circumferential direction and/or in parallel to the piston axis. The maxima 62 can be designed at the seat 60 so as to be annularly circumferential, or they extend in parallel or concentrically relative to the piston axis.

Figure 4:
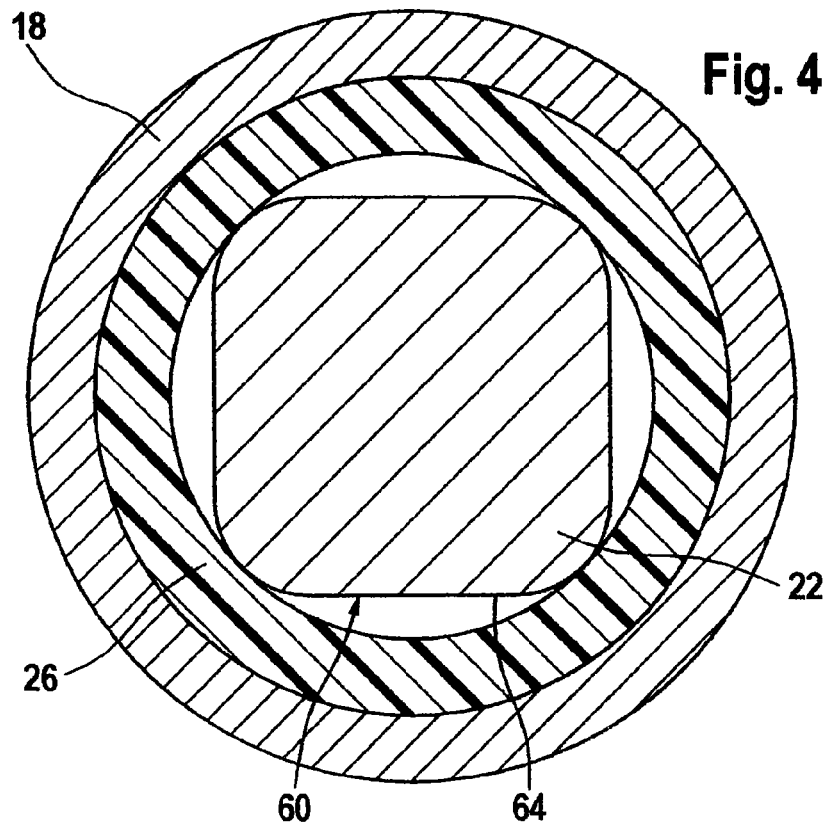
FIG. 4 is a cross-sectional view of a third embodiment, on an enlarged scale.

The seat 60 is designed as a rounded polygonal element 64 in the embodiment of FIG. 4.

Figure 5:
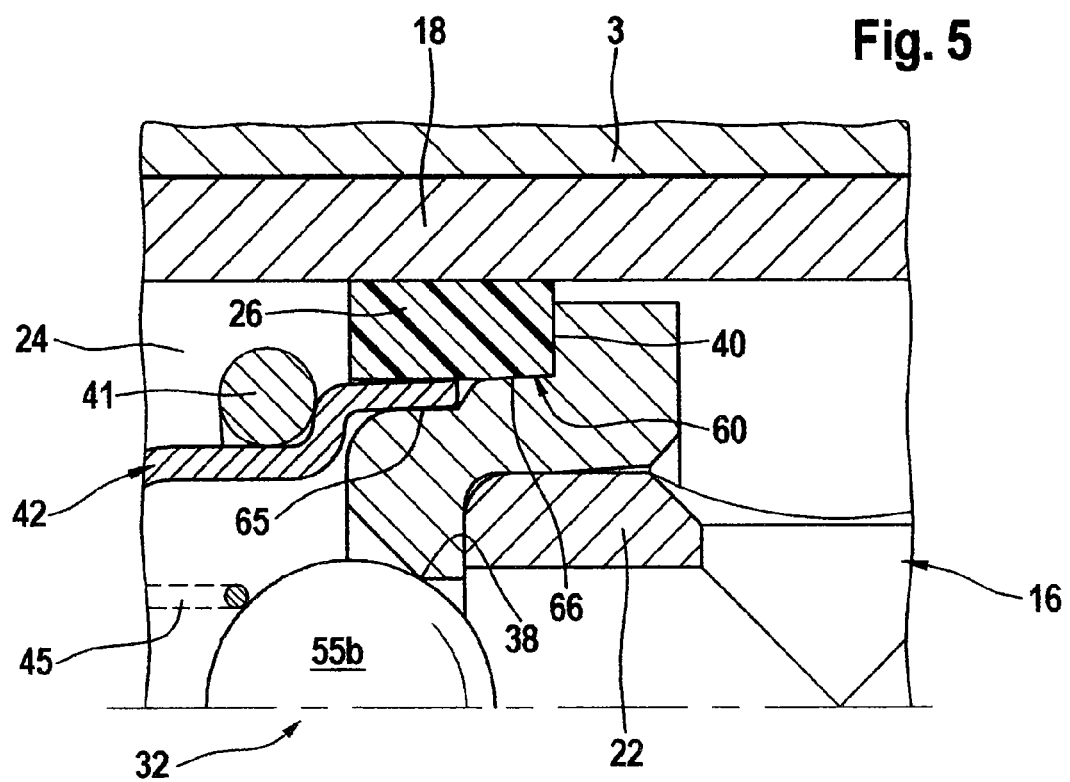
FIG. 5 is a cross-sectional view of a fourth embodiment with a clamping cone, on an enlarged scale.
Figure 6:
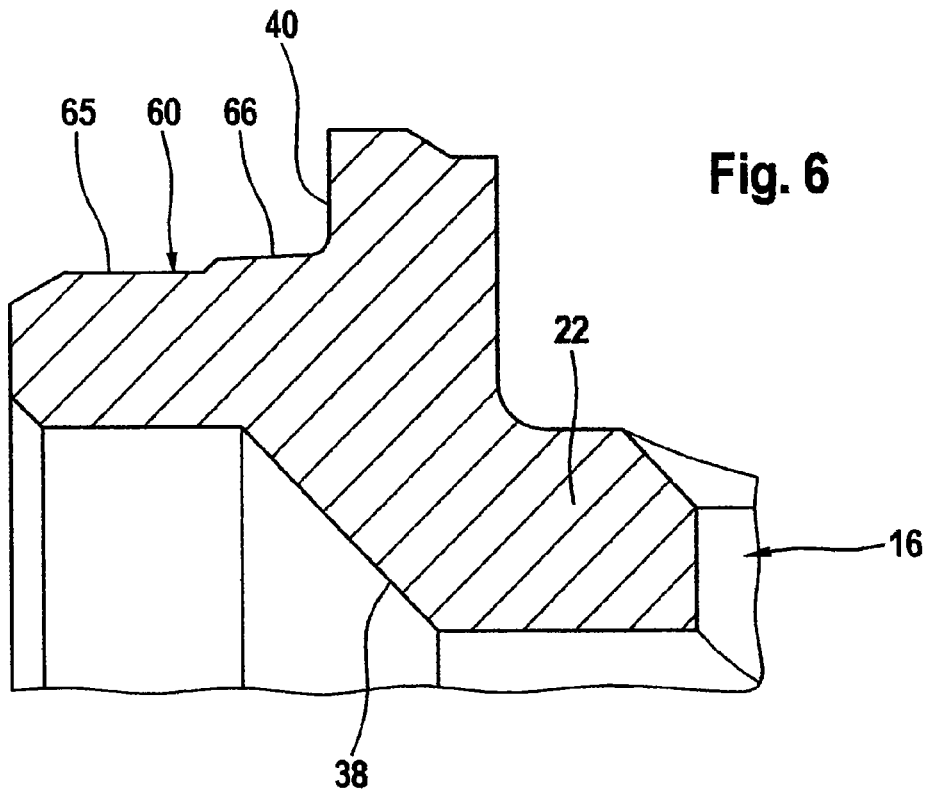
FIG. 6 is an enlarged view of an end of a piston according to FIG. 5.

FIG. 5 illustrates an embodiment in which the seat 60 has at least two portions 65, 66, one first seat portion thereof being configured substantially cylindrically or structured, while a second seat portion has a conical design.

Figure 7:
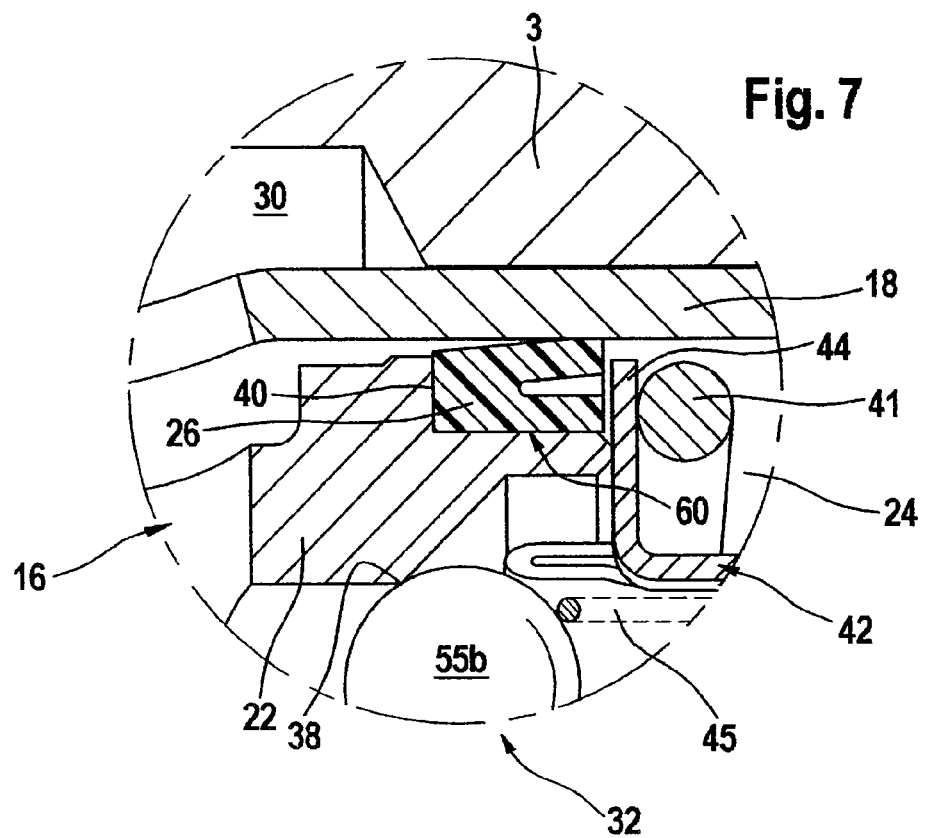
FIG. 7 is a cross-sectional view of a fifth embodiment with a lip seal, on an enlarged scale.

Principally, all embodiments can be equipped with means allowing an increasing sealing contact pressure with increasing hydraulic pressure, and vice-versa. The means have the shape of channels being open towards the displacement chamber 24, 25, and being integrated into the structure. In the embodiment of FIG. 7, the means is a sealing element 26 designed in the shape of a lip seal.

The invention claimed is:

1. A piston pump for hydraulic energy supply in a motor vehicle comprising:
   a piston movably arranged in a cylinder within an accommodating member; and
   a seat carried by the piston, the seat accommodating a sealing element with axial play and with radial elastic preload for the purpose of sealing between the piston and the cylinder and the seat having a structure which generates forces pointing radially towards a piston axis and expanding the sealing element in a radial direction, wherein the structure produces an elastic deformation of the sealing element for an increased and dosed sealing contact pressure between the piston and the cylinder and wherein the seat includes a first seat portion having an essentially cylindrical configuration, a second seat portion having a conical configuration extending radially outward relative to the first seat portion, and a shoulder that is formed between the first seat portion and the second seat portion, and
   a spring retainer that is biased against the piston by a spring to bear on the shoulder of the seat, said spring retainer being positioned between the first seat portion and the sealing element, wherein the sealing element is positioned against the spring retainer and the second seat portion of the seat.

2. The piston pump as claimed in claim 1, wherein the seat, sealing element and cylinder are configured relative to each other such that the sealing element is arranged on its seat without clamping forces.

3. The piston pump as claimed in claim 1, wherein the seat, sealing element and cylinder are configured relative to each other such that a fluid tight elastic clamping arrangement is achieved between cylinder, sealing element and piston when the piston with the sealing element is arranged in the cylinder.

4. The piston pump as claimed in claim 1, wherein the structure of the seat has an intermittent abutment surface for the sealing element.

5. The piston pump as claimed in claim 1, wherein the structure of the seat has relative maxima and relative minima, and in that the relative maxima and the relative minima are arranged alternately at regular or irregular distances in a circumferential direction, in a direction parallel to the piston axis, or a combination thereof.

6. The piston pump as claimed in claim 5, wherein the maxima are designed on the seat in an annularly circumferential fashion.

7. The piston pump as claimed in claim 5, wherein the minima are grooves which extend in parallel or concentrically relative to the piston axis.

8. The piston pump as claimed in claim 1, wherein the seat is designed as a rounded polygonal element.

9. The piston pump as claimed in claim 1, wherein the seat is configured to provide an increasing sealing contact pressure with increasing hydraulic pressure and vice-versa.

10. The piston pump as claimed in claim 9, wherein the seat has a channel-like design and is open towards a displacement chamber.

11. The piston pump as claimed in claim 1, wherein the piston pump is configured to control a vehicle brake system.

12. The piston pump as claimed in claim 1, wherein the piston is within a stepped bore of the accommodating member.

13. The piston pump as claimed in claim 12, wherein the stepped bore is provided with a closure.

14. The piston pump as claimed in claim 12, wherein the cylinder is defined by an inside surface of the stepped bore.

15. The piston pump as claimed in claim 12, wherein the cylinder is defined by a bush positioned within the stepped bore.

16. The piston pump as claimed in claim 1, wherein the piston has an at least partly hollow design with a pipe portion and carries a valve seat for at least one non-return valve which is arranged at least partly in the hollow portion and serves for the ventilation of a working chamber.

17. The piston pump as claimed in claim 1, wherein the spring is provided in the cylinder and acts upon an abutment bearing, on the one hand, and on the piston, on the other hand.

* * * * *